March 5, 1963 R. M. NORDBY 3,080,449

REMOTE CONTROL SYSTEMS

Filed May 13, 1960 2 Sheets-Sheet 1

INVENTOR.
Roger M. Nordby
BY John J. Pederson
Atty.

March 5, 1963 R. M. NORDBY 3,080,449

REMOTE CONTROL SYSTEMS

Filed May 13, 1960 2 Sheets-Sheet 2

INVENTOR.
Roger M. Nordby
BY John J. Pederson
Atty.

United States Patent Office
3,080,449
Patented Mar. 5, 1963

3,080,449

REMOTE CONTROL SYSTEMS

Roger M. Nordby, Wilmette, Ill., assignor to Zenith Radio Corporation, a corporation of Delaware Filed May 13, 1960, Ser. No. 28,912
7 Claims. (Cl. 178—5.8)

Figure 1:
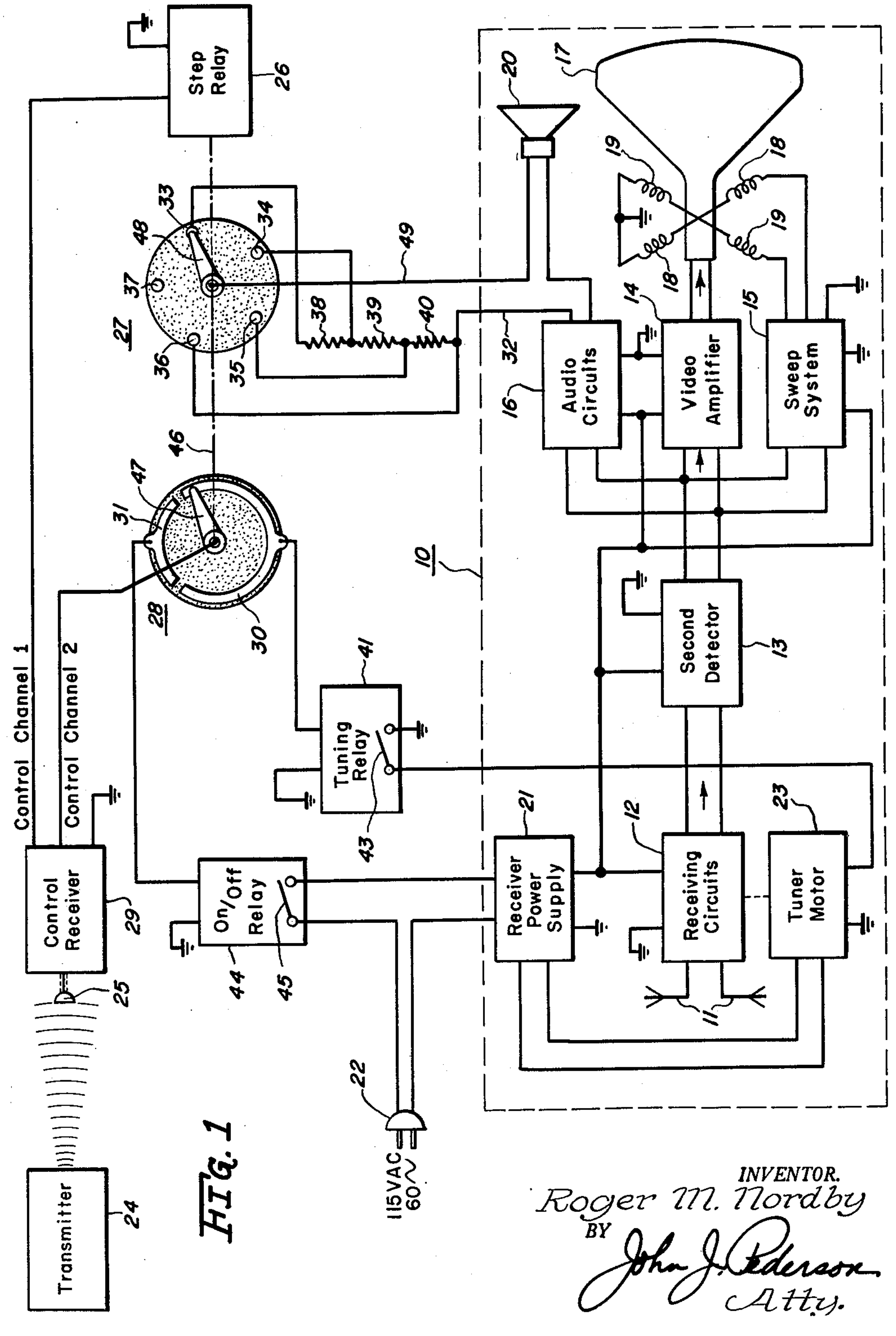

The present invention is directed to remote control systems and concerns in particular such systems for selectively controlling a plurality of operating characteristics of a controlled device.

The use of a remote control system for controlling the several operating characteristics of a controlled device such as a television receiver is now a common practice in the art. The remote control system greatly enhances the convenience of operation of the device. For example, in the case of a television receiver, the user may tune to different channels, change volume, mute the sound and perform many other functions from the convenience of his armchair. In industrial applications many situations require a remotely controlled device. As the number of controlled operating characteristics increases, this necessitates an increase in the number of control channels in the remote control system, with an attendant increase in cost and complexity. An example of a controlled device which has a relatively large number of operating characteristics is a combination television receiver, AM-FM radio receiver, and phonograph. In such a combination maximum versatility requires that provision be made for tuning the television or radio receiver, switching the radio between AM and FM operation, operating the reject mechanism of the phonograph at will, muting the sound portion of the received telecast, controlling the audio volume, and actuating the "on-off" switch.

One way to construct a remote control system which will control all of these many operating characteristics and still remain relatively inexpensive is to use a type of remote control system where each control channel performs multiple functions. This has been accomplished by utilizing one of the control channels as a function selector for the remaining channels; however, with prior arrangements of this type, one of the control channels must be devoted exclusively to function selection.

Accordingly, it is a principal object of this invention to provide a remote control system in which the number of operating characteristics which can be controlled with a given number of control channels is increased.

A corollary object is to accomplish this result with a relatively inexpensive arrangement.

The present invention provides a wireless remote control system for utilizing two distinctive remote control signals for selectively controlling at least three operating characteristics of a controlled device. The system comprises a receiver for detecting the remote control signals which is provided with a pair of control channels for respectively developing first and second output signals in response to the remote control signals. A first switch is included in one of the control channels (the first channel) and is actuable, in response to the first output signal, between at least three operating positions. A second switch is provided with an input terminal coupled to the other control channel (the second channel) and is switchable between a first and a second output terminal. Means coupled to the first channel are responsive to actuation of the first switch between two of its operating positions to control one of the operating characteristics of the controlled device; means coupled to the first output terminal of the second switch are responsive to applied signals for controlling a second one of the operating characteristics; and means coupled to the second output terminal of the second switch are responsive to applied signals for controlling the third operating characteristic of the controlled device. Finally, means responsive to actuation of the first switch into its third operating position are provided for operating the second switch to determine which of the two last-mentioned means is actuated by the second output signal.

Figure 2:
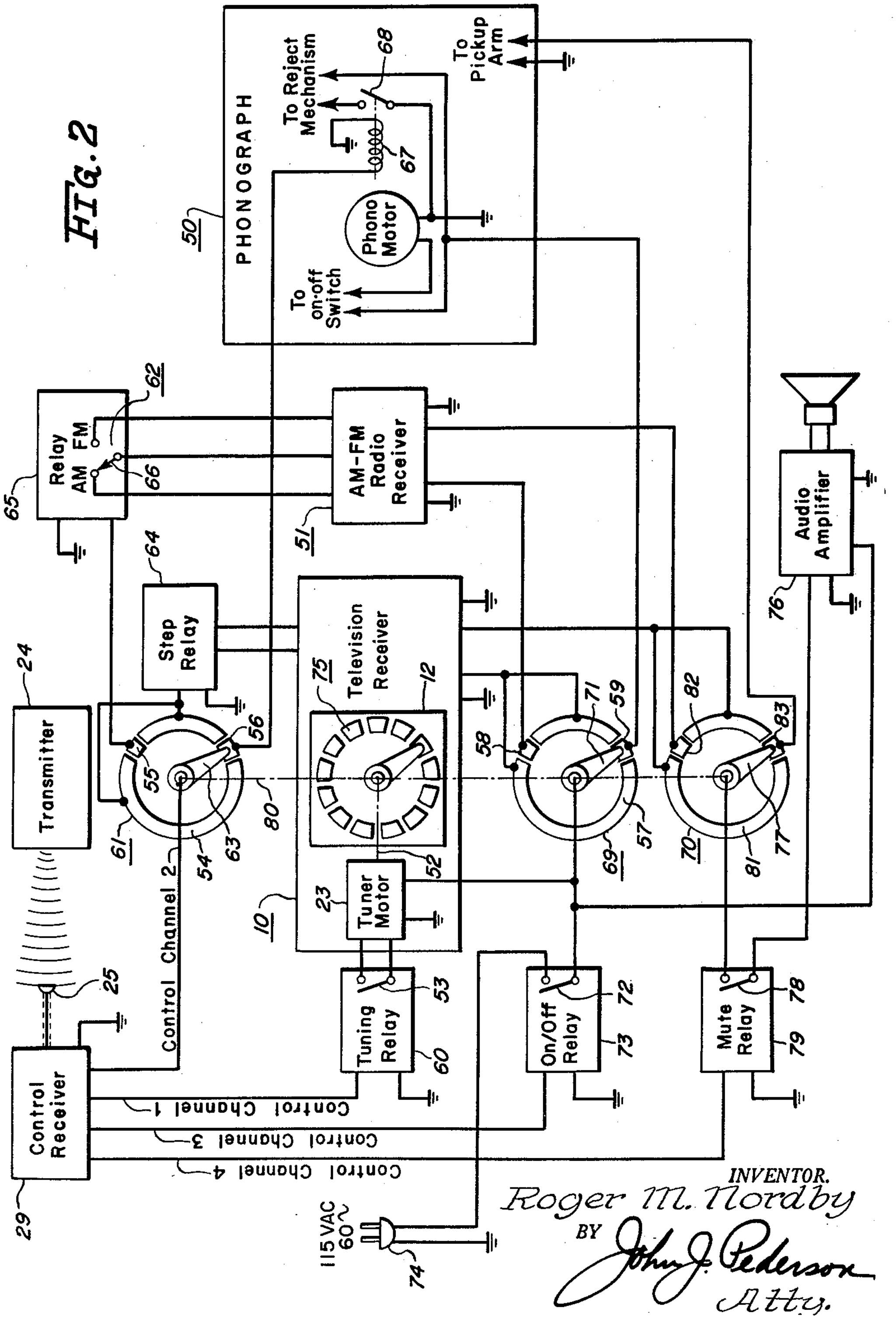

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is a schematic circuit diagram of a wireless remote control system embodying the invention and adapted to control a television receiver; and FIGURE 2 is a schematic diagram of an alternative embodiment of the present invention, adapted for remotely controlling a combination television receiver, AM-FM radio receiver and phonograph.

In the embodiment of FIGURE 1, a conventional television receiver chassis 10 is shown in simplified block diagram form as an example of a type of device which may be controlled by the wireless remote control system constructed in accordance with the invention. The television receiver chassis 10 includes an antenna 11 coupled to a receiving circuit unit 12; receiving circuits 12 may include the usual radio-frequency amplifier, channel selector, first detector, and intermediate-frequency amplifier stages found in most conventional receivers. Receiving circuits 12 are coupled to a second detector 13 which, in turn, is coupled to a video amplifier 14, to a sweep system 15, and to the usual audio circuits 16. The output of video amplifier 14 is coupled to the electron gun of a cathode-ray image reproducer 17. The output of sweep system 15 is coupled to the deflection yoke associated with the picture tube, here illustrated schematically by coils 18 and 19. Audio circuits 16 are coupled through a switch 27 to the usual loudspeaker 20. The operating circuits of the receiver are provided with the necessary operating potentials from a receiver power supply 21 which is adapted for connection to an ordinary 115-volt, 60-cycle source by means of a conventional power plug 22. A tuner motor 23 is mechanically connected to the channel selector switch of receiving circuits 12 for remote control operation thereof.

The construction and operation of television receiver 10 are entirely conventional (except for switch 27 which will be described later) and may be varied as desired without having any effect upon the invention; accordingly, only an extremely brief description of its operation is included here. A television signal is intercepted at antenna 11 and suitably amplified and detected in receiving circuits 12 to develop an intermediate-frequency signal which is supplied to second detector 13. The second detector develops a composite video signal which is supplied to video amplifier 14, sweep system 15, and audio circuit 16. The video information portions of the signal are utilized to control the intensity of an electron beam developed in picture tube 17, whereas the synchronizing signals are employed to control deflection of the beam across the image screen of the picture tube under the influence of the sweep signals developed in system 15 and applied to deflection yoke 18, 19. The audio portion of the composite video signal is suitably detected in circuit 16 and employed to energize loudspeaker 20.

The control receiver 29 which detects the remote control signals produced by the ultrasonic transmitter 24 is a frequency selective amplifier coupled to a transducer or microphone 25. Transmitter 24 may be of the type including longitudinal-mode vibrators such as aluminum rods and strikers which are operatively associated with each rod. When the user operates a striker, a rod is struck on its end and generates an ultrasonic signal of a frequency determined by the physical length of the rod. By using several rods of different lengths, remote control signals of several distinctively different frequencies may be generated. In the illustrated embodiment of FIGURE 1, ultransonic transmitter 24 selectively develops ultrasonic control signals of two distinctive frequencies. Control signals radiated by transmitter 24 are detected by control receiver 29 to develop a first or a second output signal in control channel 1 or 2, depending upon the frequency of the transmitted remote control signal.

In this embodiment of the invention, a first switch 27 is included in control channel 1. Switch 27 comprises a movable contact or switch arm 48 and five fixed terminals 33–37. Switch arm 48 is mechanically coupled to a step relay 26. Step relay 26 is coupled to control channel 1 and sequentially rotates switch arm 48 in a clockwise direction to each terminal 33–37 in response to successively applied output signal pulses from control channel 1. Respective attenuators such as resistors 38, 39 and 40 are connected between terminals 33, 34; 34, 35; and 35, 36, while terminal 37 is unconnected or floating. Lead 32 from audio circuits 16 is connected to terminal 36 of switch 27, and lead 49 from loudspeaker 20 is connected to switch arm 48 of switch 27. Thus, whenever switch arm 48 contacts terminal 33, all three attenuators 38–40 are placed in series with the audio circuit to loudspeaker 20; with switch arm 48 contacting terminal 34, resistor 38 is cut out of the audio circuit and only resistors 39 and 40 remain in the circuit; with switch arm 48 contacting terminal 35, only resistor 40 is in the audio circuit; and when switch arm 48 contacts terminal 36, there is a direct connection from audio circuits 16 to loudspeaker 20. With switch arm 48 contacting floating terminal 37, the audio input to loudspeaker 20 is open-circuited and loudspeaker 20 is in a muted condition.

A second switch 28 is provided with an input terminal in the form of a movable contact or switch arm 47 coupled to control channel 2 and switchable between a first output terminal 30 and a second output terminal 31. A tuning relay 41 is coupled to the first output terminal 30 of switch 28 and is responsive to the output signals of control channel 2 for controlling the tuning of television receiver 10. Relay 41 includes an instantaneous type switch 43 which is incorporated in the energizing circuits of tuner motor 23. An "on-off" relay 44 is coupled to the second output terminal 31 of switch 28 and is responsive to the output signals of control channel 2 for turning television receiver 10 "on" or "off." Relay 44 comprises a bistable switch 45 which is in series with a power lead from power plug 22 to receiver power supply 21. Relay 44 alternately opens and closes switch 45 when actuated by successive output signals from control channel 2.

Switch arms 47 and 48 are ganged for unicontrol operation by a mechanical linkage 46. The mechanical linkage 46 is responsive to the operation of switch 27 into its fifth operating position, with switch arm 48 in contact with terminal 37, for operating switch 28 to establish switch arm 47 in contact with its second output terminal 31; in each of the other operating positions of switch 27, with switch arm 48 contacting any of terminals 33–36, switch 28 is operated by the mechanical linkage means to bring switch arm 47 into contact with its first output terminal 30.

In operation, it may be assumed that switch arm 47 is in contact with terminal 31. To turn the receiver chassis 10 "on," the user operates the striker of the particular rod of transmitter 24 which radiates the distinctive control signal that develops an output signal in control channel 2. The output signal actuates the "on-off" relay 44 and bistable switch 45 is closed thereby completing the power circuit between power plug 22 and receiver power supply 21. If switch arm 47 of switch 28 is not in contact with output terminal 31, step relay 26 must be actuated by successive output signal pulses from control channel 1 to bring arm 47 of switch 28 into this position; ordinarily, however, such operation is not necessary since switch arm 47 must be in contact with terminal 31 when receiver chassis 10 is turned "off" by actuation of relay 44, and ganged switches 27 and 28 are not ordinarily rotated until after receiver 10 has been turned "on."

If television receiver 10 was tuned to an active channel during its last period of operation, a picture will probably appear on the cathode-ray image reproducer 17 when the receiver 10 is turned "on." However, due to switch arm 48 of switch 27 contacting floating terminal 37, loudspeaker 20 is muted. If the user wishes to hear the sound portion of the received telecast he operates the other striker of transmitter 24 to generate the proper control signal for developing an output signal in control channel 1. At the receipt of the first output signal pulse from control channel 1, switch arm 48 is rotated by step relay 26 into contact with terminal 33. In this position, the audio circuit to the speaker 20 is completed through three resistors 38–40. This position produces the lowest volume level since the maximum number of resistors are in the audio circuit to loudspeaker 20. To raise the volume level, the user again transmits an appropriate signal to develop an output signal in control channel 1, thereby rotating switch arm 48 of switch 27 into contact with terminal 34. This series of operations can continue until switch arm 48 is in contact with terminal 36, in which condition there is a direct connection between audio circuits 16 and loudspeaker 20 and the volume is at its maximum level. An additional pulse mutes the sound, since switch arm 48 is rotated into contact with floating terminal 37 and the audio input to loudspeaker 20 is open-circuited. Thus, switch 27 is actuable in response to an output signal from control channel 1 between five operating positions, and the volume level of television receiver 10 is controlled by actuation of switch 27 between four of its operating positions by means of resistors 38–40 and the connecting leads 32 and 49 to the audio circuit of television receiver 10.

While switch 27 is in any of its four operating positions used for volume control, mechanical linkage 46 establishes switch arm 47 of switch 28 in contact with output terminal 30. In this condition, any output signal from control channel 2 is directed to tuning relay 41. When the user transmits the remote control signal associated with control channel 2, an output signal pulse is developed which actuates relay 41 and closes switch 43 thereby energizing tuner motor 23 to rotate the channel selector switch of receiving circuits 12 to the next channel position. Known expedients may of course be employed to provide for the automatic skipping of unoccupied or vacant channels.

To turn television receiver 10 "off," first the sound portion of the telecast is muted by developing one or more sequential output signals in control channel 1, depending on the volume level, thus causing relay 26 to rotate switch arm 48 of switch 27 into contact with terminal 37. In this condition, mechanical linkage 46 establishes switch arm 47 of switch 28 into contact with output terminal 31. The user then transmits to control receiver 29 the control signal associated with control channel 2; the developed output signal pulse is directed through switch 28 to "on-off" relay 46, and bi-stable switch 45 is opend thus de-energizing television receiver chassis 10.

Unlike prior remote control systems, multiple functions for a given control channel are achieved without devoting a separate control channel solely to function selection. Control channel 1 performs as a function selector for control channel 2 in addition to its primary function of controlling the volume level of television receiver 10. In its role as a function selector, control channel 1 determines whether control channel 2 will control the tuning of television receiver 10 or turn the receiver "on" or "off."

FIGURE 2 illustrates an alternative embodiment of the invention comprising a remote control system utilizing four distinctive remote control signals for selectively controlling selected operating characteristics of a combination phonograph 50, AM-FM radio receiver 51, and television receiver 10. Control channels 1 and 2 of control receiver 29 correspond to the correspondingly designated channels of FIGURE 1.

In this embodiment of the invention a channel selector switch 75 of receiving circuits 12 of television receiver 10 is included in control channel 1. The channel selector switch is operable between thirteen operating positions. Eleven of these positions are used for tuning purposes and the other two are unused. Channel selector switch 75 is coupled to tuner motor 23 by means of a mechanical linkage 52. Tuner motor 23 is coupled to a tuning relay 60. Relay 60 comprises an instantaneous type switch 53 which is incorporated in the energizing circuits of tuner motor 23. Relay 60 is coupled to control channel and responds to successive output signals from control channel 1 to energize tuner motor 23 so that it sequentially rotates channel selector switch 75 from one to another of its thirteen operating positions, in a manner well known in the art; if desired, the drive mechanism 52 may include means for causing skipping of unoccupied or vacant channels in a manner well known in the art.

A second switch 61 is provided with an input terminal in the form of a movable contact or switch arm 63 coupled to control channel 2 and switchable between three output terminals 54–56. A step relay 64 is coupled to the first output terminal 54 of switch 61. With switch arm 63 contacting terminal 54, relay 64 is responsive to the output signals of control channel 2 for controlling the volume of television receiver 10. Relay 64 is coupled to receiver 10 and controls the volume in the same mode as disclosed in FIGURE 1. A relay 65 is coupled to the second output terminal 55 of switch 61. With switch arm 63 contacting terminal 55, relay 65 is responsive to successive applied signals from control channel 2 for selectively conditioning AM-FM radio receiver 51 for AM or FM operation. Relay 65 comprises a bi-stable switch 62 having a switch arm 66 and a pair of fixed contacts designated "AM" and "FM." Switch 62 is coupled to radio receiver 51. In its AM position, with switch arm 66 contacting terminal "AM," switch 62 closes appropriate contacts of radio receiver 51 to condition it for AM operation; in the FM position, with switch arm 66 contacting terminal "FM," switch 62 opens the AM contacts and closes other contacts to condition the receiver for FM operation. The details of this switching arrangement are not material to the invention and may be identical to those used in conventional AM-FM radio receivers for non-remote switching between AM and FM operation.

A solenoid 67 of phonograph 50 is coupled to a third output terminal 56 of switch 61. When solenoid 67 is actuated by an output signal from channel 2, it closes switch 68 to complete the power circuit to the reject mechanism of phonograph 50. Details of a suitable reject mechanism will be found in the copending application of Ralph W. Galke, et al., Serial No. 11,883, filed February 29, 1960 and assigned to the same assignee as the present application.

A switch 69 is provided with an input terminal in the form of a movable contact or switch arm 71 which is switchable between three output terminals 57–59. Control channel 3 is coupled to an "on-off" relay 73 comprising a bi-stable switch 72 which is in series with a lead from a power plug 74 to switch arm 71 of switch 69. The above lead is also connected to tuner motor 23 and to an audio amplifier 76. Relay 73 alternately opens and closes switch 72 when actuated by successive output signals from control channel 3. Terminals 57–59 of switch 69 are coupled to the power inputs of television receiver 10, radio receiver 51, and phonograph 50.

A switch 70 is provided with a movable contact or switch arm 77 switchable between three output terminals 81–83. Control channel 4 is coupled to a mute relay 79 comprising a switch 78 which is in series with a lead from audio amplifier 76 to switch arm 77 of switch 70. Relay 79 alternately opens and closes switch 78 when actuated by successive output signals from control channel 4. Terminals 81–83 of switch 70 are connected to the audio outputs of television receiver 10, radio receiver 51, and phonograph 50.

Switches 69 and 70 are identical in construction with switch 61. Switch arms 63, 71 and 77 of switches 61, 69 and 70 are ganged with the channel selector switch 75 of television receiver 10 for uni-control operation. A mechanical linkage 80 gangs switch arms 63, 71 and 77 together and linkage 80 is in turn coupled to the mechanical linkage 52 between tuner motor 23 and channel selector switch 75 of television receiver 10. The mechanical linkage 80 is responsive to the operation of channel selector switch 75 into two of its operating positions for operating switches 61, 69 and 70 to establish switch arms 63, 71 and 77 respectively in contact with either output terminals 55, 58 and 82 or 56, 59 and 83; in each of the eleven other operating positions of the channel selector switch, switch arms 63, 71 and 77 are operated by the mechanical linkage means into contact with output terminals 54, 57, and 81 respectively.

In operation, the user successively actuates relay 60 by transmitting an appropriate control signal to develop an output signal in control channel 1 and rotates the switch arms of switches 61, 69 and 70 to terminals 54, 57 and 81 when he wishes to use television receiver 10. Since terminals 54, 57 and 81 correspond to the eleven positions of channel selector switch 75 of television receiver 10 which may be used for incoming video signals, the user can rotate the channel selector switch (by actuation of relay 60) to any of the eleven positions still keeping the switch arms of switches 61, 69 and 70 in contact with terminals 54, 57 and 81. With switch arm 63 of switch 61 contacting terminal 54, the output signal from control channel 1 is directed to step relay 64 enabling the user to control the volume of television receiver 10. Switch arm 71 of switch 69 contacting terminal 57 directs power to television receiver 10. Receiver 10 is turned "on" or "off" by means of "on-off" relay 73 which is actuated by the output signals from control channel 3. Switch arm 77 of switch 70 contacting terminal 81 directs the audio output of television receiver 10 through switch 78 of relay 79 to audio amplifier 76. The sound portion of the telecast is muted by means of relay 79 which is actuated by an output signal from control channel 4.

With the switch arms of switches 61, 69 and 70 contacting terminals 55, 58 and 82, radio receiver 51 is ready for use. Switch 61 now directs the output signals from control channel 1 to relay 65 which conditions radio receiver 51 for AM or FM operation. Power is now directed to radio receiver 51 and the audio output of the radio is directed to audio amplifier 76 and and relay 79.

Finally, operation of the switch arms of switches 61, 69 and 70 into contact with terminals 56, 59 and 83 couples control channels 2, 3 and 4 to phonograph 50. Control channel 2 controls the reject mechanism of phonograph 50 and power and audio are handled as above.

Thus, control channel 2 performs multiple functions without the use of another control channel devoted exclusively to function selection. Control channel 1 selects one of the three functions (volume control of television receiver 10, conditioning radio receiver 51 for AM or FM operation, and operating the reject mechanism of phonograph 50) that control channel 2 is to perform, in addition to its primary function of controlling the tuning of television receiver 10. In addition, control channel 1 determines whether control channels 3 and 4 will control the power and audio of television receiver 10, radio receiver 51 or phonograph 50.

Thus the invention provides a new and improved remote control system in which an increased number of operating characteristics can be controlled by a given number of control channels, and accomplishes this result with a relatively inexpensive construction.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a wireless remote control system for utilizing two distinctive remote control signals for selectively controlling at least three operating characteristics of a controlled device, the combination comprising: a receiver for detecting said remote control signals and provided with a pair of control channels for respectively developing first and second output signals in response to said remote control signals; means including a first switch included in a predetermined one of said channels and actuable, in response to said first output signal, between at least three operating positions; a second switch provided with an input terminal coupled to the other of said channels and switchable between first and second output terminals; means coupled to said predetermined channel and responsive to actuation of said first switch between two of its said operating positions to control one of said operating characteristics; means coupled to said first output terminal of said second switch and responsive to applied signals for controlling a second one of said operating characteristics; means coupled to said second output terminal of said second switch and responsive to applied signals for controlling the third of said operating characteristics; and means responsive to actuation of said first switch into its third said operating position for operating said second switch to determine which of said two last-mentioned means is actuated by said second output signals.

2. The combination of claim 1 in which the means responsive to actuation of said first switch into its third said operating position for operating said second switch comprises a mechanical linkage between the two said switches.

3. In a wireless remote control system for utilizing two distinctive remote control signals for selectively tuning, turning "on" and "off," and controlling the volume of a television receiver, the combination comprising: a receiver for detecting said remote control signals and provided with a pair of control channels for respectively developing first and second output signals in response to said remote control signals; means including a first switch included in a predetermined one of said channels and actuable, in response to said first output signal, between five operating positions; a second switch provided with an input terminal coupled to the other of said channels and switchable between first and second output terminals; means coupled to said predetermined channel and responsive to actuation of said first switch between four of its said operating positions for controlling the volume of said television receiver; means coupled to said first output terminal of said second switch and responsive to applied signals to control the tuning of said television receiver; means coupled to said second output terminal of said second switch responsive to applied signals for turning said television receiver "on" and "off"; and means responsive to actuation of said first switch into its fifth said operating position for operating said second switch to determine which of said two last-mentioned means is actuated by said second output signal.

4. In a wireless remote control system for utilizing two distinctive remote control signals for selectively controlling at least three operating characteristics of a television receiver, the combination comprising: a receiver for detecting said remote control signals and provided with a pair of control channels for respectively developing first and second output signals in response to said remote control signals; means including a television channel selector switch included in a predetermined one of said channels and actuable, in response to said first output signal, between a plurality of operating positions; a second switch provided with an input terminal coupled to the other of said channels and switchable between first and second output terminals; means coupled to said predetermined channel and responsive to actuation of said channel selector switch between all but one of said operating positions to control the tuning of the television receiver; means coupled to said first output terminal of said second switch and responsive to applied signals for controlling a second one of said operating characteristics; means coupled to said second output terminal of said second switch and responsive to applied signals for controlling the third of said operating characteristics; and means responsive to actuation of said channel selector switch into said one operating position for operating said second switch to determine which of said two last-mentioned means is actuated by said second output signal.

5. A wireless remote control system for utilizing two distinctive remote control signals for selectively controlling the tuning and volume of a television receiver and conditioning a radio receiver for AM or FM operation, the combination comprising: a receiver for detecting said remote control signals and provided with a pair of control channels for respectively developing first and second output signals in response to said remote control signals; means including a television channel selector switch included in a predetermined one of said channels and actuable, in response to said first output signal, between a plurality of operating positions; a second switch provided with an input terminal coupled to the other of said channels and switchable between first and second output terminals; means coupled to said predetermined channel and responsive to actuation of said channel selector switch between all but one of said operating positions to control the tuning of the television receiver; means coupled to said first output terminal of said second switch and responsive to applied signals for controlling the volume of said television receiver; means coupled to said second output terminal of said second switch and responsive to applied signals for conditioning said radio receiver for AM or FM operation; and means responsive to actuation of said channel selector switch into its said one operating position for operating said second switch to determine which of said two last-mentioned means is actuated by said second output signal.

6. In a wireless remote control system for utilizing two distinctive remote control signals for selectively controlling the tuning and volume of a television receiver and the reject mechanism of a phonograph, a combination comprising: a receiver for detecting said remote control signals and provided with a pair of control channels for respectively developing first and second output signals in response to said remote control signals; means including a television channel selector switch included in a predetermined one of said channels and actuable, in response to said first output signal, between a plurality of operating positions; a second switch provided with an input terminal coupled to the other of said channels and switchable between first and second output terminals; means coupled to said predetermined channel and responsive to actuation of said channel selector switch between all but one of said operating positions to control the tuning of the television receiver; means coupled to said first output terminal of said second switch and responsive to applied signals for controlling the volume of said television receiver; means coupled to said second output terminal of said second switch and responsive to applied signals for controlling the reject mechanism of said phonograph; and means responsive to actuation of said channel selector switch into said one operating position for operating said second switch to determine which of said two last-mentioned means is actuated by said second output signal.

7. In a wireless remote control system for utilizing two distinctive remote control signals for selectively controlling the tuning and volume of a television receiver, the reject mechanism of a phonograph, and for conditioning a radio receiver for AM or FM operation, the combination comprising: a receiver for detecting said remote control signals and provided with a pair of control channels for respectively developing first and second output signals in response to said remote control signals; means including a television channel selector switch included in a predetermined one of said channels and actuable, in response to said first output signal, between a plurality of operating positions; a second switch provided with an input terminal coupled to the other of said channels and switchable between three output terminals; means coupled to said predetermined channel and responsive to actuation of said channel selector switch between all but two of its positions to control the tuning of the television receiver; means coupled to said first output terminal of said second switch and responsive to applied signals for controlling the volume of said television receiver; means coupled to said second output terminal of said second switch and responsive to applied signals for controlling the reject mechanism of said phonograph; means coupled to said third output terminal of said second switch and responsive to applied signals for conditioning said radio for AM or FM operation; and means responsive to actuation of said channel selector switch into said two operating positions for operating said second switch to determine which of said three last-mentioned means is actuated by said second output signal.

No references cited.